United States Patent [19]

Malphettes

[11] 3,990,415

[45] Nov. 9, 1976

[54] INTAKE PASSAGES OF INTERNAL COMBUSTION ENGINES

[75] Inventor: Jean Malphettes, Rueil, France

[73] Assignees: Regie Nationale des Usines Renault, Boulogne-Billancourt; Automobiles Peugeot, Xvleme, both of France

[22] Filed: Mar. 7, 1975

[21] Appl. No.: 556,266

Related U.S. Application Data

[62] Division of Ser. No. 402,735, Oct. 2, 1973, abandoned.

[30] Foreign Application Priority Data

Dec. 1, 1972 France .............................. 72.42744

[52] U.S. Cl. ...................... 123/52 MB; 123/119 D; 261/63; 55/276
[51] Int. Cl.² ....................................... F02B 75/18
[58] Field of Search ....... 55/276; 123/124 R, 119 D, 123/52 MB; 261/63

[56] References Cited
UNITED STATES PATENTS

| | | | |
|---|---|---|---|
| 1,982,625 | 12/1934 | Barker | 123/124 R |
| 3,530,648 | 9/1970 | Ravenel | 55/276 |
| 3,664,316 | 7/1970 | Garcea | 123/124 R |

FOREIGN PATENTS OR APPLICATIONS 720,611 7/1931 France ............................. 55/276

*Primary Examiner*—Ronald H. Lazarus
*Attorney, Agent, or Firm*—Oblon, Fisher, Spivak, McClelland & Maier

[57] ABSTRACT

An improvement in internal combustion engines for suppressing faulty carburetion caused by acoustic vibrations in the engine is provided by an acoustic resonator communicated with the intake manifold between the valves and the carburetor thereof. The resonator consists of an enclosed chamber of preselected volume connected to the intake manifold by at least one tubular conduit.

3 Claims, 3 Drawing Figures

INTAKE PASSAGES OF INTERNAL COMBUSTION ENGINES

This is a continuation, division, of application Ser. No. 402,735 filed Oct. 2, 1973.

BACKGROUND OF THE INVENTION

The present invention relates to an improvement of the intake passage of carbureted internal combustion engines for suppressing faulty carburetion caused by acoustic vibrations in the motor.

It has been observed that the main defects in carburetion encountered at low speeds, such as speeds on the order of 1200 – 1300 RPM, with conventional carburetors result from the presence of acoustic vibrations at the height of the carburetor. Since the level of these vibrations are subject to tremendous variationn over this speed range, the carbon monoxide content of the exhaust gas varies between such limits that satisfactory engine operation is impossible to achieve, if established antipollution norms are to be observed.

This phenomenon may be explained by the fact that the air supply at the level of the carburetor may be considered as being the sum of a constent flow supply and an alternating one of acoustic origin, the frequency and amplitude of which are determined or affected by the engine speed. When this amplitude is greater than that of the constant flow and the phase of the alternating supply is such that it opposes that of the constant flow supply, a net reverse flow occurs with actual backflow of the air-fuel mixtures to the carburetor where it is further enriched, thus causing an irregularity in the supply of fuel and an increase in the pollution of the atmosphere being caused by the engine.

SUMMARY OF THE INVENTION

Accordingly, it is an object of the present invention to provide an apparatus for improving the carburetion characteristics of an internal combustion engine.

Another object of the present invention is to provide an apparatus for suppressing faulty carburetion in an internal combustion engine caused by acoustic vibrations therein.

A further object of the present invenion is to provide an apparatus for improving the consistency of the suppply of fuel to an internal combustion engine by eliminating backflow of the air-fuel mixture to the carburetor.

Still a further object of the invention is to provide means for decreasing the pollution of the atmosphere caused by internal combustion engines.

The foregoing and other objects are achieved by the present invention, which aims at suppressing such reverse flow effects by attacking the source thereof, which until now has not been clearly recognized, and consists of connecting a resonator with the intake manifold, between the valves and the carburetor. The resonator is connected in such a way that, taking into account the coupling with the intake air stream, it has its maximum effect in the speed range where the faulty carburetion occurs. The acoustic vibrations generated at the level of the engine and propagating along the manifold towards the carburetor are, to a great extent, intercepted by the resonator and are thereby greatly attenuated upon reaching the carburetor. The resonator volume is chosen as a function of the desired effectiveness.

BRIEF DESCRIPTION OF THE DRAWINGS

Various other objects, features and attendant advantages of the present invention will be more fully appreciated as the same becomes better understood from the following detailed description, when considered in connection with the accompanying drawings, wherein like reference characters designate like or corresponding parts throughout the several figures, and in which.

DETAILED DESCRIPTION OF THE PREFERRED EMBODIMENT

Figure 1:
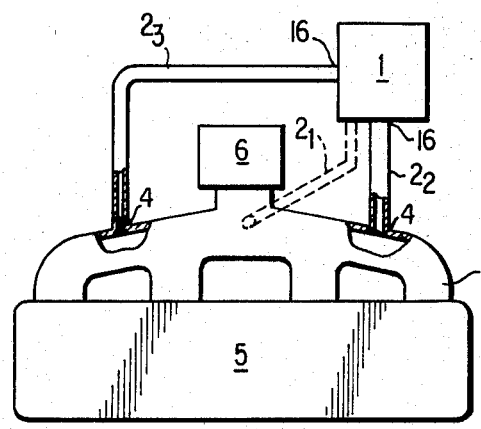
FIG. 1 is a diagrammatic illustration of the air and fuel intake circuit of an engine constructed according to the present invention.

Referring now to the drawings, and more particularly to FIG. 1 thereof the resonator constitutes a closed volume 1 having at least one narrow tube $2_1$, shown in dashed lines, of predetermined length and diameter, which connects the resonator to the intake manifold between the intake valves of the engine 5 and its carburetor 6.

In a preferred arrangement, the resonator 1 consists of a closed volume or chamber of predetermined size to which are connected two narrow tubes $2_2$ and $2_3$, respectively having predetermined lengths $L_2$ and $L_3$ and diameters $D_2$ and $D_3$ as indicated at 16. The other ends of the tubes $2_2$ and $2_3$ are connected respectively to the manifold 3 between the valves and the carburetor at opposite stations.

In addition, to avoid the accumulation of gas in the resonator volume 1, small perforations may be provided in the walls thereof. This resonator volume being at vacuum, this sets up a gentle flow of outside air thereinto which prevents the gases from flowing up tubes $2_2$ and $2_3$, from the intake manifold.

This embodiment thereby permits varying the effect of the resonator by appropriately changing the respective dimensions of the two tubes $2_2$ and $2_3$. Two different size tubes, for example, broaden the range of moderate effectiveness, whereas two identical tubes give high effectiveness, but over a more narrow range.

One could also achieve these results by utilizing constrictions or diaphragms 4 for damping the resonance, being located where desired in the tubes connecting with the resonator volume 1.

The invention extends, in a more general way, to any resonator whether hydraulic or provided with a diaphragm, communicating with the intake manifold, between the valves and carburetor thereof, and intended to reduce acoustic vibrations therewithin.

Figure 2:
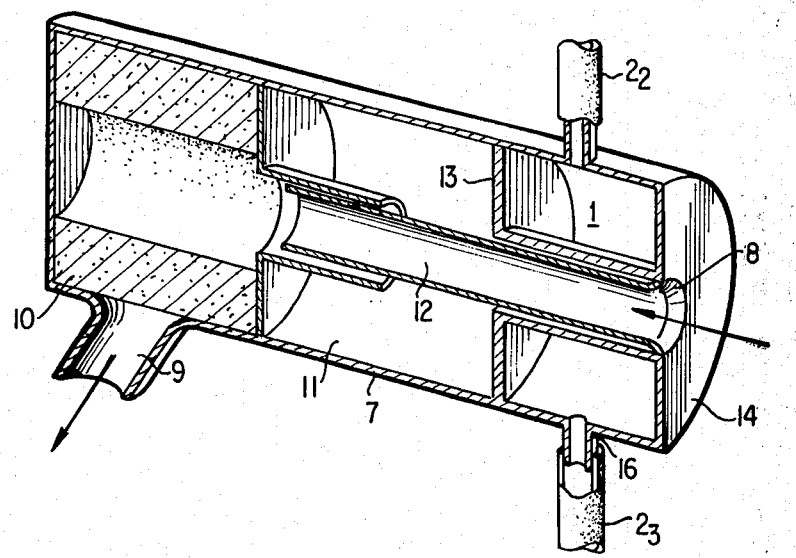
FIG. 2 is a perspective view being broken away and shown partly in cross-section of an embodiment of a resonator formed according to the present invention.

Referring now to FIG. 2, there is shown a cross-section in perspective of a conventional type of cylindrical air filter which incorporates the closed volume 1 of the resonator of this invention.

Thus, a cylindrical housing 7 is provided with an axial inlet 8 at one end and a lateral outlet 9 adjacent the other end, and contains a tubular-configured filter 10 in the end wherein the outlet 9 is disposed and an acoustic tuning volume 11 of tubular configuration being defined by a central axial tuning duct 12 in the central region of the housing. The resonator chamber 1 is provided adjacent the acoustic tuning volume 11 in the inlet end of the housing, but is isolated acoustically therefrom by an annular partition 13. The resonator chamber 1 is traversed by the air inlet duct 8, which extends axially therethrough, but is also isolated therefrom by a suitable duct or conduit, which may be an extension of duct 12.

The perforations for preventing the accumulation of gas are indicated by the reference numeral 14 and are disposed in the one end of the housing 7, opening into the resonator chamber 1. Taps 16 are provided for connection to the narrow tubes $2_2$ and $2_3$, being positioned in the peripheral portion of housing 7 at the inlet end thereof. The filter assembly thus is given the supplemental function of attenuating acoustic waves downstream of the carburetor, this arrangement offering a minimum degree of clutter, and being inexpensive to produce.

By way of a numerical example, considering a four cylinder in-line engine of average displacement, a resonator chamber having a volume of about 0.6 liter with narrow tubes of 20 centimeters length and 1.8 centimeters in diameter may be employed.

Figure 3:
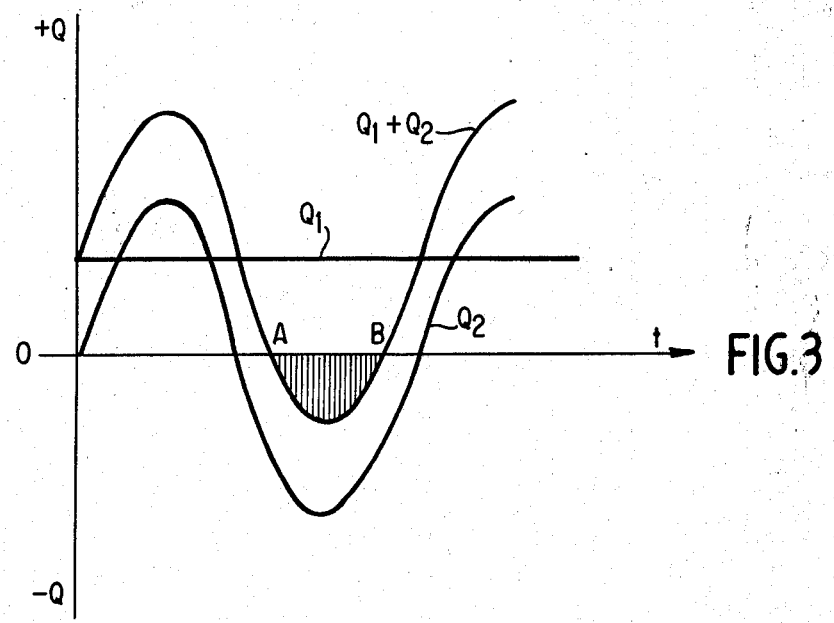
FIG. 3 is a diagram in the form of a graph illustrating the suppressing of backflow which the arrangement of the present invention produces.

In FIG. 3, there is shown a graph illustrating the phenomenon of backflow heretofore causing the carburetion problem, wherein the ordinate is the air supply and is indicated by Q and the abscissa is time and is indicated by t. For certain engine speeds the acoustically produced alternating supply $Q_2$ is greater in amplitude than the constant supply flow $Q_1$ and the curve of the net supply flow $Q_1 + Q_2$ takes on negative values during the interval of time AB corresponding to reversal of the flow.

Reduction of the alternating supply $Q_2$ by the resonator conforming to the invention will eliminate this region AB of backflow, the constant supply flow $Q_1$ always being greater than the maximum amplitudes of the alternating supply $Q_2$, and the defect in carburetion is thus eliminated.

The subject resonator of the present invention corrects, over it effective range, all of the other carburetion problems connected with the presence of acoustic waves at the level of the carburetor, and in particular, the anomalies in richness resulting from the action of these waves on the carburetor mixing chamber.

Significantly reducing the amplitude of acoustic waves over its range of effectiveness, the resonator of the present invention also constitutes an excellent attenuator of the noise of the intake ports, especially for speed around 2500 – 3000 RPM, which are those most used, and thus appreciably improves the acoustical comfort of the passengers of the vehicle.

Obviously many modifications and variations of the present invention are possible in light of these teachings. It is to be understood therefore that within the scope of the appended claims, the invenion may be practiced otherwise than as specifically described herein.

Wat is claimed as new and desired to be secured by letters patent of the United States is:

1. In an internal combustion engine having an intake manifold, a plurality of intake valves associated therewith and a carburetor connected to said intake manifold and said intake valves, the improvement comprising:

means forming an air inlet supply for said intake manifold;

air filter means connected between said air inlet supply means and said intake manifold; an outlet means connected, connected by a passageway to said intake manifold;

an acoustic tuning chamber formed about at least a portion of said air inlet supply means;

an acoustic resonator chamber formed about at least another portion of said air inlet supply means upstream of said air filter and said acoustic tuning chamber; and at least the connecting passageway between said acoustic resonator chamber and said intake manifold;

said improvement being operative to suppress backflow of the air-fuel mixture to the carburetor.

2. In an internal combustion engine having an intake manifold, a plurality of intake valves therefor, and a carburetor connected to said intake manifold and said intake valves, the improvement comprising:

acoustic resonator means defining an enclosed chamber of predetermined volume for reducing the acoustic vibrations of said engine and being connected to said intake manifold by at least one narrow tube between said valves thereof and said carburetor, and said enclosed chamber of said acoustic resonator means having incorporated therein an air filter in an extension of a cylindrical housing thereof and being axially traversed by an air inlet duct and an acoustic tuning chamber said enclosed chamber further including an air outlet connected by a passageway to the intake manifold.

3. The improvement as set forth in claim 2 characterized by said enclosed chamber having perforations therein for permitting a slight pressurization to be produced by the entry of outside air thereinto with respect to the pressure of the intake system.

* * * * *